United States Patent

Beyer et al.

[11] Patent Number: 5,869,805
[45] Date of Patent: Feb. 9, 1999

[54] METHOD AND DEVICE FOR WORKING MATERIALS USING PLASMA-INDUCING LASER RADIATION

[75] Inventors: Eckhard Beyer, Roetgen-Rott; Jörg Beersiek, Aachen; Wolfgang Schulz, Langerwehe; Holger Nitsch, Mönchengladbach; Peter Abels, Alsdorf, all of Germany

[73] Assignee: Fraunhofer-Gesellschaft Zur Forderung Der Angewandten Forschung E.V., Munich, Germany

[21] Appl. No.: 817,187

[22] PCT Filed: Aug. 4, 1995

[86] PCT No.: PCT/DE95/01017

§ 371 Date: Jun. 5, 1997

§ 102(e) Date: Jun. 5, 1997

[87] PCT Pub. No.: WO96/09912

PCT Pub. Date: Apr. 4, 1996

[30] Foreign Application Priority Data

Sep. 26, 1994 [DE] Germany .......................... 44 34 409.0

[51] Int. Cl.⁶ .................................................. B23K 26/04
[52] U.S. Cl. ................................ 219/121.83; 219/121.63; 219/121.64
[58] Field of Search ........................ 219/121.83, 121.63, 219/121.64

[56] References Cited

U.S. PATENT DOCUMENTS

| 5,155,329 | 10/1992 | Terada et al. | 219/121.63 |
| 5,304,774 | 4/1994 | Durheim | 219/121.63 |
| 5,486,677 | 1/1996 | Maischner et al. | 219/121.83 |

FOREIGN PATENT DOCUMENTS

| 0 112 762 A2 | 7/1984 | European Pat. Off. . | |
| 0 437 226 A2 | 7/1991 | European Pat. Off. . | |
| 3843841 | 6/1990 | Germany | 219/121.64 |
| 4027714 | 3/1992 | Germany | 219/121.63 |
| 41 06 608 A1 | 8/1992 | Germany . | |
| 4126351 | 2/1993 | Germany | 219/121.83 |
| 4313287 | 10/1994 | Germany | 219/121.83 |

*Primary Examiner*—Geoffrey S. Evans
*Attorney, Agent, or Firm*—Herbert Dubno

[57] ABSTRACT

A process for material working with plasma induced by high-energy radiation, especially laser radiation, in which the radiation originating from the region of the workpiece is observed along the axis of the laser radiation focused along the axis on the workpiece as a function of the time. To obtain a measure of the penetration depth of the vapor capillary in the workpiece the process is so carried out that exclusively the cross section of the vapor capillary is observed with a depth of field encompassing the entire workpiece thickness, and that the mean value of the intensity of the plasma radiation is used as a measure of the penetration depth.

12 Claims, 8 Drawing Sheets

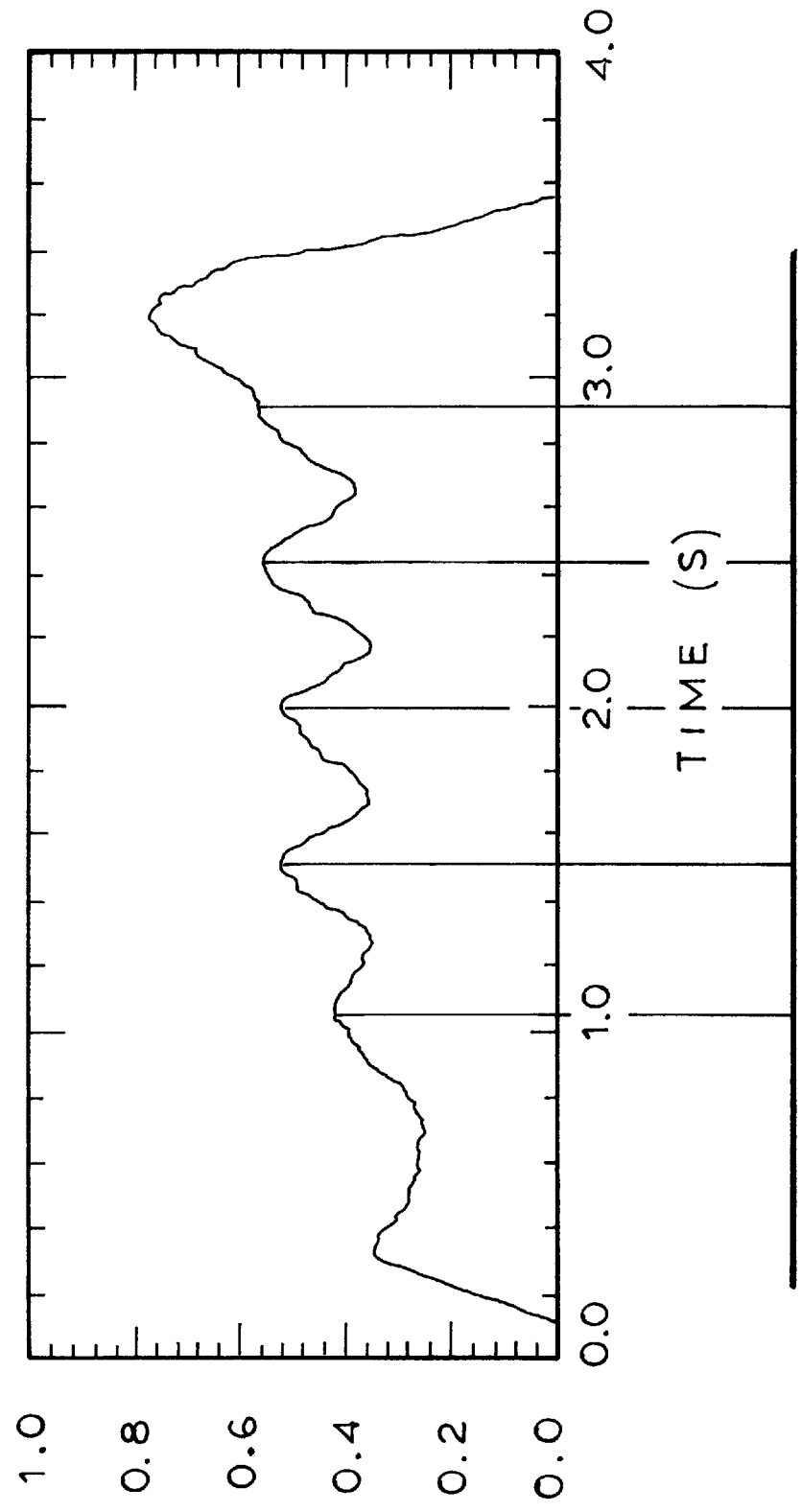

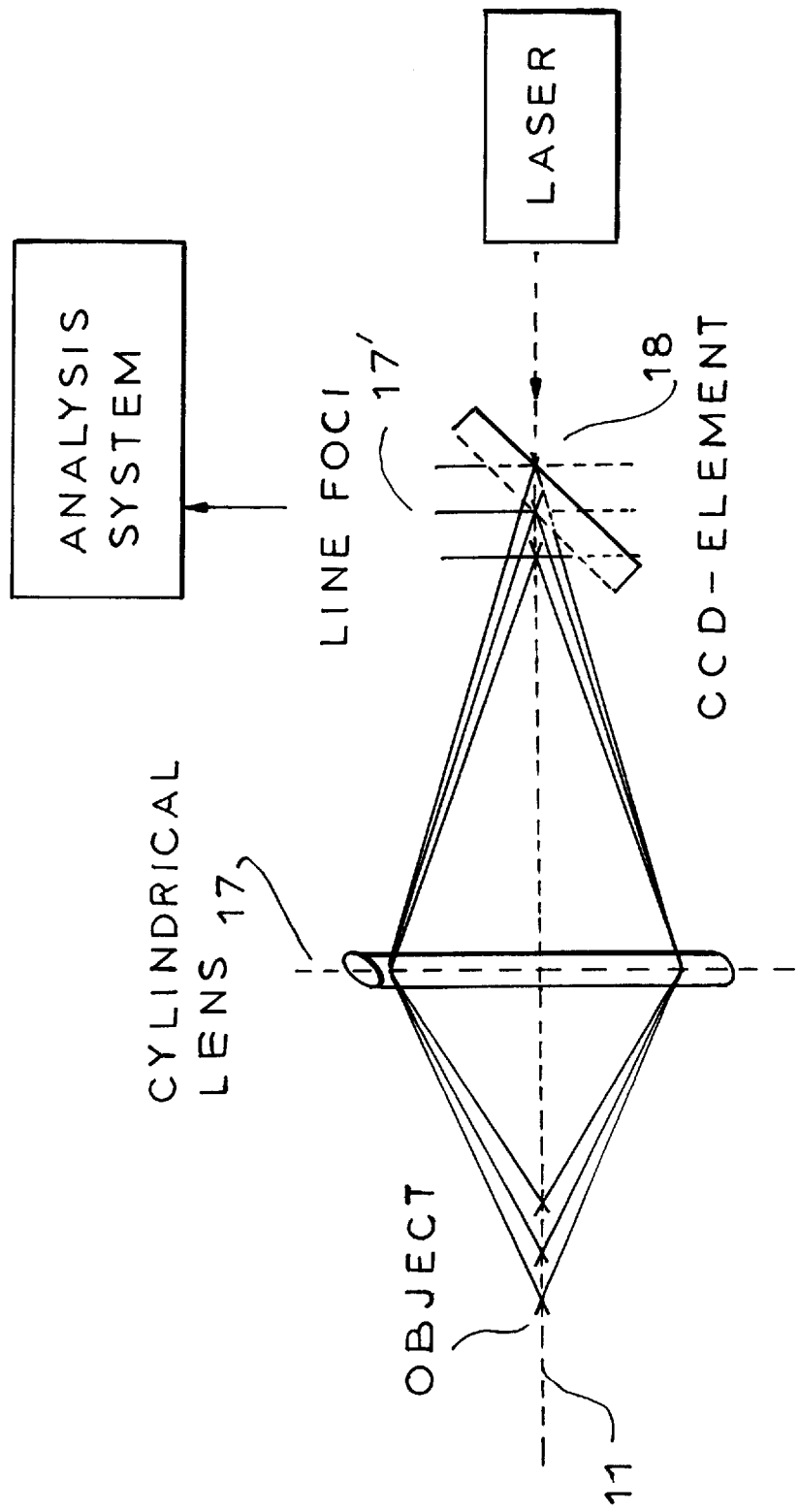

METHOD AND DEVICE FOR WORKING MATERIALS USING PLASMA-INDUCING LASER RADIATION

CROSS REFERENCE TO RELATED APPLICATION

This is a national stage of PCT/DE95/01017 filed 4 Aug. 1995 based, in turn, upon German national application P4434409.0 of 26 Sep. 1994 under the International Convention.

FIELD OF THE INVENTION

Our present invention relates to a method of working materials with plasma-inducing high energy radiation, especially laser radiation, in which radiation from the workpiece and originating in the region of the workpiece is monitored as a function of time along the axis of the laser radiation focused on the workpiece.

BACKGROUND OF THE INVENTION

Processes with the aforedescribed process features are generally known as laser welding processes. The thus observed optical and acoustical signals are used for monitoring and control. Such signals arise from the workpiece surface or from above the workpiece surface. It is thus possible, for example, to detect a weld breakthrough only in isolated parameter regions. It is also generally known to observe the underside of a workpiece to detect a weld breakthrough. The workpiece is, however, during industrial finishing processes generally only accessible with difficulty at the underside. It is therefore necessary to detect the penetration depth in the workpiece from the upper side, i.e. from the side to which the laser radiation is fed.

OBJECT OF THE INVENTION

The invention so improving a process with the aforedescribed features that the penetration depth can be continuously detected from above the workpiece during the working of the material.

SUMMARY OF THE INVENTION

This object is achieved in that the observation is confined exclusively to the cross section of the vapor capillary with a depth of focus encompassing the total workpiece thickness and in that the mean value of the intensity of the plasma beam determined by this observation is used as a measure of the penetration depth.

For the invention it is significant that an observation is effected over the entire depth of the zone of interaction of the laser beam with the workpiece. It is also required to acquire signals from the interior of the vapor capillary reliably and to evaluate them. This is achieved in that the observation is confined to the cross section of the vapor capillary is exclusively and thus detrimental lateral signals are excluded. The requisite depth of focus required for this is so determined that the entire workpiece thickness is encompassed in the observation.

The light intensity of the plasma which arises in the plasma working is observed. Since this intensity fluctuates strongly, however, the mean value of the intensity of the plasma beam is used as a measure for the penetration depth. If the laser beam penetrates so deeply into the workpiece that the depth of the interaction zone is equal to the workpiece thickness, the breakthrough of welding is imminent. There is a characteristic change in the mean value of the intensity as a function of time during the progress of the material working. If necessary, the working process can be interrupted or so carried out that a breakthrough of welding is avoided thereby avoiding an undesired result. With the aforedescribed process, for simplification it is accepted that the density and the temperature of the radiation-emitted particles in the vapor capillary are constant. With this presumption, the measured radiation intensity is, to a first approximation proportional to the penetration depth of the vapor capillary in the workpiece. There are however a number of influence factors upon the density and the temperature within the vapor capillary so that the presumption is not accurate. Influence factors include, for example, dynamic processes within the vapor capillary as a consequence of the movement of the absorption front and the melt front. The working geometry also plays a measurable role. As a consequence, significant intensity fluctuations can disturb the measured result. These fluctuations can however be excluded in that the mean value of the radiation intensity can be determined while excluding intensity peak values which arise simultaneously with optical and/or acoustic signals which are detected laterally of the focused laser beam.

The fluctuations in the radiation intensity, however, contain information also with respect to the process in the vapor capillary or as to the location of this process. To establish the source, the process can be so carried out that the source of intensity peak values in the vapor capillary is determined by transit time differential measurements axially and laterally of one another from measured values which are associated temporally. At these locations of the intensity peak values, working defects can arise, indicated by spatter and pores. It enables a quality control of the working process.

The invention relates to an apparatus for working materials with plasma induced by laser radiation which is focused from a reflector on the workpiece and with observing optics receiving radiation arising from the workpiece in the direction of the focused laser beam. To be able to determine the penetration depth of the interaction zones of the laser beam or the vapor capillary in the workpiece continuously as a function of time and also as to location, information from different depth regions of the vapor capillary can be recovered by an apparatus so constructed that the radial observation region of the observing optics is limited to the cross section of the vapor capillary so that a mean value of the intensity of the measuring device detecting the plasma radiation is provided, and so that the observation optics has a cylindrical lens with a diode row arranged downstream of the cylinder lens in the beam direction and is inclined and connected to an evaluating unit which evaluates the output values of the individual diodes in relation to a reference value. This reference value is, for example, the mean value of the radiation intensity. The limitation of the radial observation region of the observation optics to the cross section of the vapor capillary ensures the exclusion of effects outside the region of the workpiece around the vapor capillary. The measuring unit forms a mean value of the intensity of the plasma radiation to the exclusion of fluctuations which might influence the measuring result of the penetration depth in undesired ways. With the aid of the observation optics, radiation signals arising from the different depths of the vapor capillary are detected and thereafter evaluated by the evaluation unit, for example, in the sense of a localization of an intensity peak value.

The aforedescribed object is attained by limiting the radial observation region of the observation optics to the cross section of the vapor capillary. A main value of the intensity of the measuring unit responding to the plasma radiation is obtained and the observation optics can have a rotationally symmetrical lens along the optical axis of which a light sensor is arranged which detects that radiation component which arises from the conjugated plane of the focus of the observation optics. At least a further light sensor is arranged out of the optical axis of the observation optics and acquires a radiation component which arises from a nonconjugated plane of the focus of the observation optics. All of the light sensors can be connected to an evaluating unit which evaluates the measured radiation intensity in relation to a predetermined reference value. This reference value is for example the mean value of the radiation intensity.

So that the aforedescribed apparatus can be formed with a simple configuration, the light sensors can be light waveguides.

A greater precision of the measured results of the aforedescribed apparatus is possible if the spectral range of the radiation arising from the workpiece is limited with a bandpass filter. The bandpass filter cuts out spectral ranges of the plasma light which do not provide sufficiently clear information from the depth of the vapor capillary.

When the apparatus is so configured that the laser radiation is an annular mode radiation, that a mirror with a hole forms the focusing mirror and that the hole of the focusing mirror is arranged within the annular maximum of the annular mode, a reduction in the power loss of the radiation region of the hole of the perforated mirror is achieved. This is especially advantageous when a comparatively large hole is chosen to achieve the highest possible axial resolution at a small axial depth of field.

The configuration of the observation or viewing optics with respect to the arrangement of its focus and thus the conjugated plane with respect to this focus can be such that the apparatus enables the meeting point or focus of the laser beam on the workpiece to be observed both from above or from below. Advantageously, in the sense of a problem-free determination of full penetration welding and a matching of the apparatus for observation of the total cross section of the vapor capillary, the focus of the observation optics can be arranged on the underside of the workpiece.

BRIEF DESCRIPTION OF THE DRAWING

The above and other objects, features, and advantages will become more readily apparent from the following description, reference being made to the accompanying drawing in which:

FIG. 4 is a graph of the correlation between the time course of the sensor signal and the penetration depth of the welding as a function of the time;

FIG. 5 is a schematic illustration of the viewing optics according to the invention.

SPECIFIC DESCRIPTION

Figure 1:
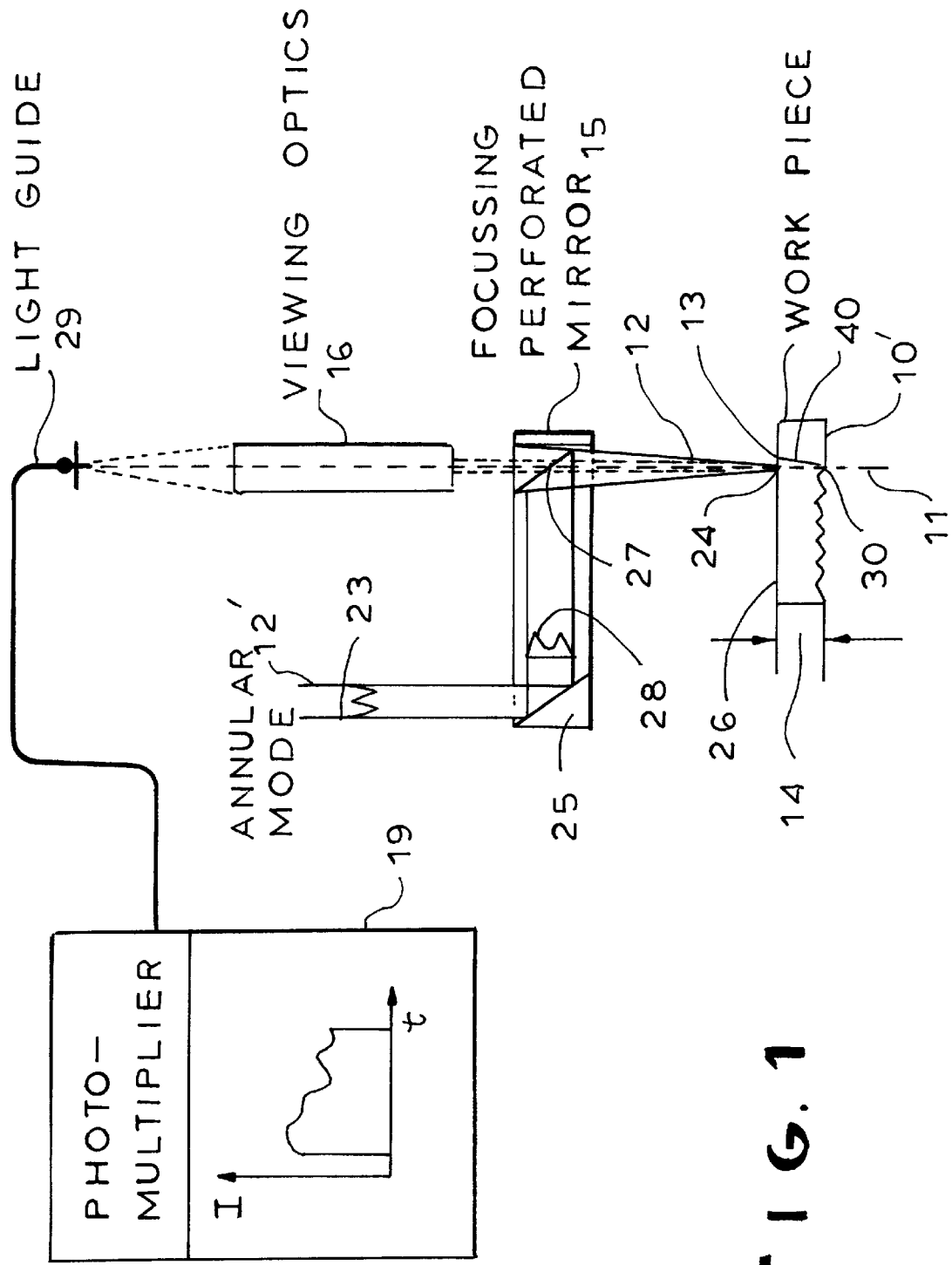
FIG. 1 is a schematic illustration of an apparatus for viewing a workpiece during machining with laser radiation.

FIG. 1 shows schematically a workpiece 10 that is machined with a focused laser beam 12. As machining operations, depending upon the laser used, welding, cutting, drilling, material removal or remelting can be carried out. The laser beam 12' generated by a laser is deflected by means of a deviating mirror 25 to a focusing mirror 15 which directs the focused laser beam 12 toward the workpiece 10. The focus 24 lies for example initially on the workpiece surface 26. As a focusing mirror 15, a perforated mirror is used whose hole 27 allows within the annular maximum 28 of the laser beam 12 which is an annular mode laser beam as illustrated at 23. The hole 27 allows free space for the observation of the workpiece surface 26 in the region of the focus 24 of the workpiece 10. For observation, a viewing optics 16 can be provided which observes the focus 24 exactly in the direction of the axis 11 of the focused laser beam 12. Light from the viewing optics 16 is collected by a light waveguide 29 which connects the viewing optics 16 with an evaluating unit 19 effecting measurement evaluation.

So that the viewing optics 16 will have the highest possible resolution, the hole should be chosen so that it is as large as possible. For this purpose the viewing optics also should have the smallest possible focal length. The focus 30 of the viewing optics 16 in the embodiment of FIG. 1 is arranged at the underside 10' of the workpiece 10. The viewing optics 16 thus observes exclusively the focus 24 in the region of the total workpiece thickness 14. The focus 30 of the viewing optics 16 can, however, be arranged otherwise, for example such that both above and below the focus is observed, namely, with comparatively greater depth of field within the interaction zone of the laser beam 12 with the workpiece 10. It is possible to so arrange the focus 30 that also a region above the workpiece 10 can be observed.

The observation process is effected during the pulsed operation of the laser, for example also during the pulse spacing. The laser can be for example a $CO_2$ laser. Instead of a perforated mirror forming the focusing mirror 15, a GaAs window can be used which transmits the light of the $CO_2$ laser but does not permit light arising from the interaction zone of the workpiece 12 to pass so that an observation of the vapor capillary forming the interaction zone possible. A ZnSe window can also be used and will reflect the light of the $CO_2$ laser but pass the visible light arising in the interaction zone. Instead of a $CO_2$ laser, a Nd-YAG laser can be used for material working.

The viewing optics 16 which observes the focused laser beam 12 axially is provided with a bandpass filter. The band pass filter limits the incident light to 500 nm±5 nm and thus to the wavelength region of the total radiation spectrum which is dominated by the emission for the laser induced plasma. The depth of field of the viewing optics are varied. The depth is filled is, for example, so set that the total interaction zone or vapor capillary 13 or the workpiece thickness 14 is captured by the viewing optics. The resolution of the optics in the radial direction, i.e. transverse to the axis 11, is set to a measuring region of 0.5 mm. This means that from the signal detected by the apparatus in FIG. 1, the emission from the total region of the vapor capillary is integrally reproduced when the absorption front 41 which has been shown in FIG. 1 has a mean inclination and the capillary depth amounts to 5 mm.

Figure 2A:
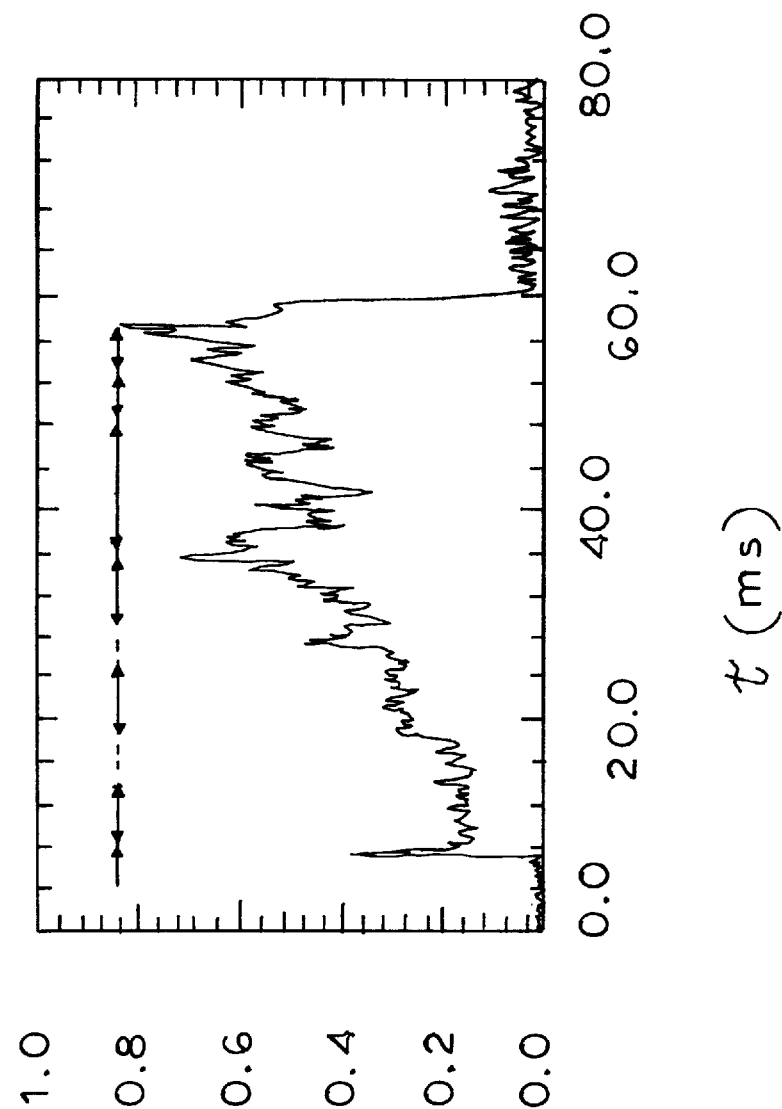
FIGS. 2a and 2b are graphs of signal characteristics with pulsing with a $CO_2$ laser.
Figure 2B:
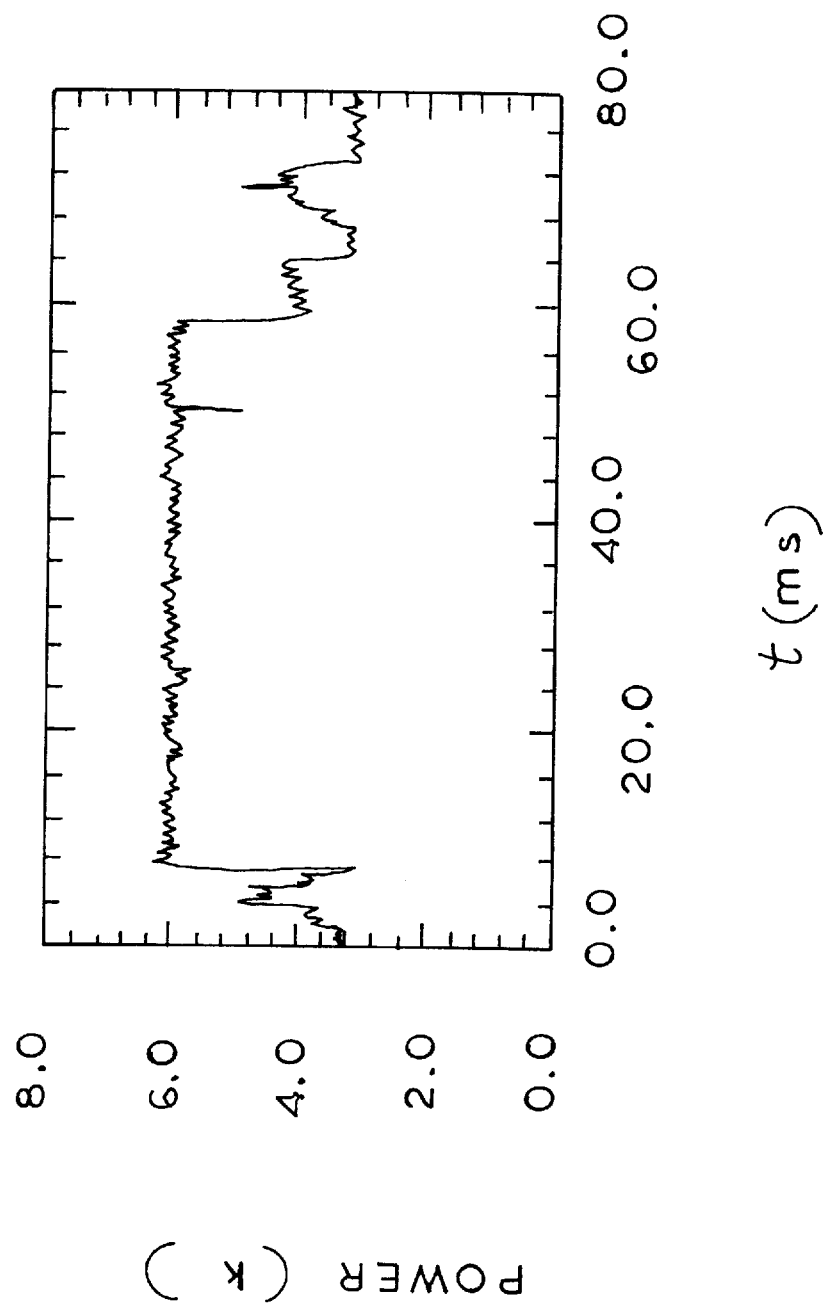

FIGS. 2a and 2b show an example of a signal pattern detected by the evaluating unit 20 with pulses of a $CO_2$ laser whose power is modulated with a frequency of 10 Hz. The lower level is about 3 kW as is shown in FIG. 2b while the higher level is about 6 kW. With the aforedescribed process parameters with the lower power, the laser induced plasma is close to extinguished. During the latter there is effected a welding process with reduced depth of penetration in the order of magnitude of the beam diameter. The result is a heat-conductive welding. At higher laser power, the deep-welding process is achieved in which the laser beam 12 induces a plasma. As a result, the laser beam 12 at the time of switching on of the high power meets a preheated melt bath, whose surface already has a temperature close to the evaporation temperature. With this procedure it can best be clarified what the characteristic effects of the deep welding are on the signal which arises from the generated plasma (see FIG. 2a).

Figure 3A:
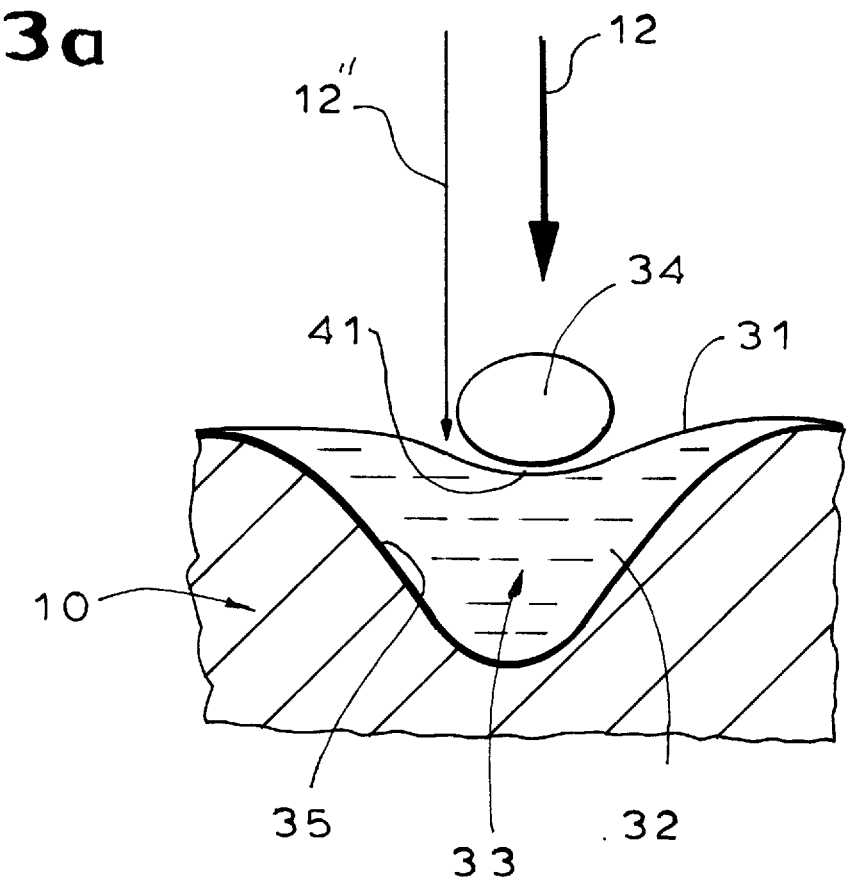
FIGS. 3a to 3c are diagrams of details of the formation of a vapor capillary in a stationary deep-welding process with laser welding with a $CO_2$ laser.

At the beginning of the interval of higher laser power, the laser beam 12 meets a smooth melt upper surface. The melt 32 of the workpiece is found in a depression formed from the solid workpiece 10. Above the melt there is formed a plasma 34. Between the plasma 34 and the melt 32 there is provided an absorption front 41, i.e. the liquid/gas forming phase boundary, namely, the region in which the laser beam meets the liquid wall of the vapor capillary 13 (FIG. 3a). Between the melt 32 and the solid workpiece 10 there is a front, i.e. the liquid/solid phase boundary. The depth of the melt front 20 gives the penetration depth; with plasma welding the depth of the melt gives the penetration depth, ignoring the depth of the absorption front depth of the vapor capillary (see FIGS. 3b and 3c).

The plasma 34 glows and the emitted light is picked up by the aforedescribed viewing optics 16, whereby, for the interpretation of the course of the signal, the above-described unit and data of this viewing optics 16 are of significance. When the absorption of the plasma is effected in a limited wavelength range in which the plasma is optically thin, the observed intensity of the radiation is proportional to the number of particles which lie in the observation region. If the sharp observation is effected axially with respect to the machining region over the entire thickness of the workpiece 10, the measured intensity of the light of the plasma is, to a first approximation, proportional to the penetration depth of the vapor capillary in the workpiece. Since the process does not run ideally, density and temperature within the vapor capillary are not constant but, for example, the partial closure of the vapor capillary by movement of the absorption front and the melt front gives rise to an increased vaporization rate during the relaxation in the stationary state. As a consequence, the emitted light or its intensity depends also from the machining parameters and limiting values. The basic process, however, is clarified in connection with FIGS. 3a to 3c which also clarifies the signal course represented in FIG. 2a.

Since the observation front 41 according to FIG. 3a initially is of a limited depth, because of the high intensity of the laser beam, a large quantity of material to be machined is vaporized suddenly. The brief high material density gives rise to a high absorption of the laser beam and, therewith, to an increased temperature of the evaporated material. The process runs so rapidly that the evaporated material cannot expand. The radiation intensity therefore increases suddenly and gives rise to an intensity peak. During the latter there is not yet any noticeable movement of the absorption front 41 and there is no true movement of the melt front 35 either.

Exactly because of the heating of the vaporized material, a superatmospheric pressure is generated with respect to the ambient atmosphere. This gives rise to an expansion of the metal vapor. As a consequence, there results a drop in the temperature of the plasma and of the material vapor density. The intensity of the plasma radiation drops. The afore-described process is represented at 1 in FIG. 2.

Figure 3B:
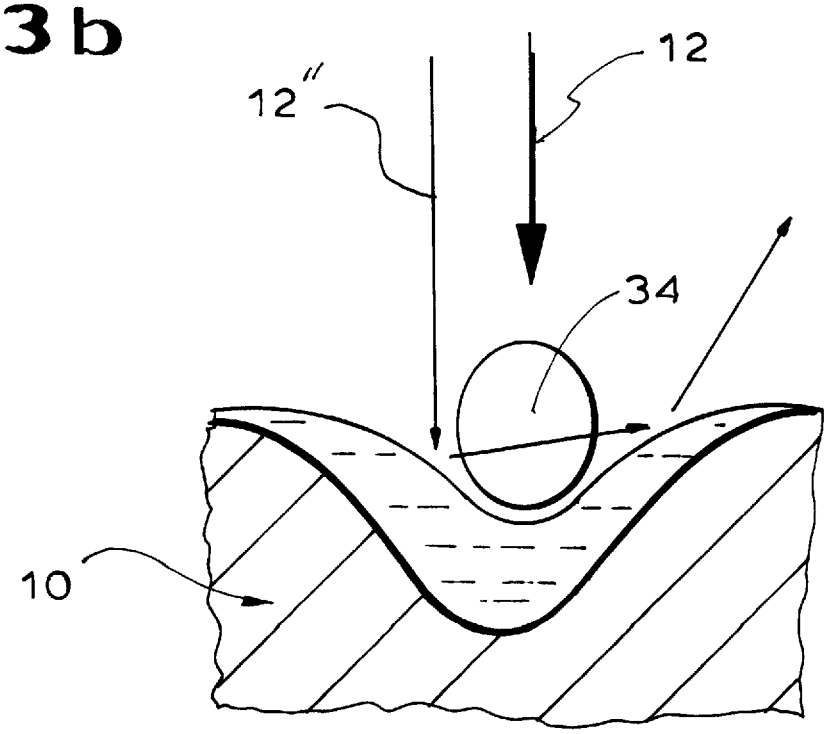

On the other hand, the expanded metal vapor presses upon the melt 32 and commences the formation of a vapor capillary. The melt 32 is largely displaced. At the lowest point of the vapor capillary and at the absorption front 41, because of the high laser power, there is still a surplus of the intensity so that the laser beam is partly reflected and thus again leaves the vapor capillary and partly is transformed into vapor work and movement of the melt front. A drilling into the solid workpiece 10 begins. FIG. 3b shows a partial beam 12' of the laser beam 12 which is partially reflected and partially absorbed. To commence the formation of the vapor capillary, displacement at the absorption front 41 begins because of the impinging back pressure of the evaporated material without significant movement of the melt front 35.

Because of the coupling of energy via the plasma to the absorption front 41 and its movement in the direction of the melt front, the drilling process in the solid material of the workpiece 10 begins. At the bottom drilling is not yet developed as has been shown in FIG. 3c. This means however that the thin melt film can fluctuate only to a small degree. Also, the observed intensity of the plasma beam can then have only slight variations superimposed thereon. These variations very clearly depend upon the course of the plasma signal, i.e. the change with time of the intensity of the plasma radiation as a function of the time.

Figure 3C:
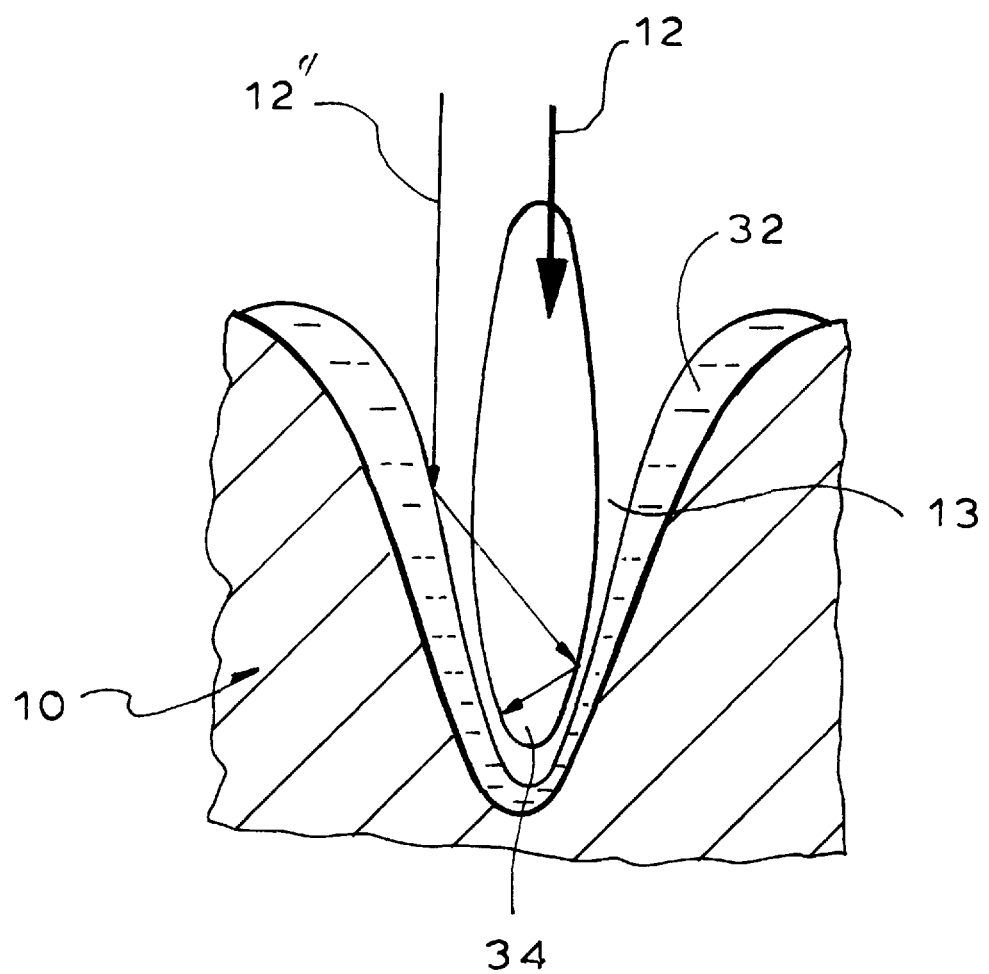

With further penetration of the vapor capillary in the solid workpiece 10, the vapor capillary becomes so deep in the middle that the second reflection meets the wall or the floor of the vapor capillary (compare FIG. 3c). As a consequence, the total absorbed laser power increases by the proportion of the second reflection which gives rise to a signal jump. Further reflections of the laser beam within the vapor capillary result in radiation absorption and correspondingly further jumps in the signal pattern. The signal level resulting from the further reflections are no longer picked up and the mean signal increase terminates when via the effect of multiple reflection, the $CO_2$ radiation is practically completely absorbed. This quasi-equilibrium state is indicated by a sharp increase in the signal fluctuation. The origin thereof is that for a further drilling into the solid material, not enough power is provided. At the capillary front, therefore, only sufficient workpiece material is vaporized as is required to drive the capillary at the given speed of advance into the solid body. Increasingly, the thermal conductivity plays a role and there is formed a thick melt film with which a sharp increase in the signal fluctuations as associated. This region is indicated at 2.

The resulting movement of the absorption front because of the back impact pressure of the pressurized material from the workpiece is effected without noticeable movement of the melt front. The associated form of the radiation signal is a strong fluctuation about the mean signal value. The plasma formation and the subsequent movement of the absorption front continue until the melt front travels with increased velocity. In this case, the strong fluctuations of the signal are suppressed. The aforedescribed sequence has been indicated in FIG. 2a at 3. With respect to the strong signal fluctuations there are significant problems in detecting the penetration depth based upon the signal pattern according to FIG. 2a.

The fluctuations however also contain information as to the process in the vapor capillary which is also necessary for determination of the penetration depth. With the aid of suitable averaging, from the signal pattern in spite of the strong signal fluctuations, a mean penetration depth can be selected. A time course of such averaging has been shown in FIG. 4. From a comparison of the time values from FIGS. 2a and 4, it can be seen that the signal pattern of FIG. 2a corresponds to the rise phase in FIG. 4. On the whole, FIG. 4 shows, as indicated on the workpiece cross section shown below, that the penetration depth or the depth of welding is qualitatively or quantitatively reflected very well by the averaged sensor signal. The signal peculiarities which arise during machining disturb the machined results. There are intensity peak values isolated in time, so-called signal peaks, which arise as a consequence of strong and rapid heating of the surface.

During the brief times of these signal peaks, a movement of the absorption front or the melt front is not possible. The quasi-periodic fluctuations of the signal which are superimposed on the stationary mean signal values derive from hydrodynamic oscillations of the absorption front in the vapor capillary. To exclude falsification of the signal pattern by such factors, triggered filters can be introduced. The triggering is effected in that acoustic and/or optical signals are introduced which can arise from, for example, strong damping and can be observed from the side, i.e. from outside the axis 11 of the laser beam 12.

It is also possible to observe intensity peak values both in the axis 11 of the laser beam 12 and also laterally therefrom. By transit time measurement of detection of the transit time differences of a signal detected along the axis of the laser beam and a signal detected laterally therefrom, the origin of the signal value in the vapor capillary can be detected. This measurement can be used for error detection.

The localization of such processes within the vapor capillary is of special significance. Special configurations of the apparatus can be used for observing the plasma radiation to achieve local images from the vapor capillary over its depth. FIG. 5 shows in a schematic illustration the configuration of a viewing optics with a cylinder lens 17. In the foci 17' of this lens the conjugated plane for each respective focus is imaged as a line.

The conjugated plane which is associated with the furthest removed location from the cylinder lens 17 and thus the deepest predetermined positions within the vapor capillary is sharply imaged as the line focus 17' furthest from the cylinder lens 17. To examine the vapor capillary over the entire depth, it is required to determine the respective interesting line foci 17'. For this purpose a diode row 18 is arranged behind the cylinder lens in the direction of travel of the beam and which includes an acute angle to the axis 11 as is visible from FIG. 5. As a result thereof, the different planes of the vapor capillary are sharply imaged on different diodes. If an intensity peak value occurs in the region of the bottom of the vapor capillary so a corresponding diode signal is to be expected in the region of the diode furthest removed from the cylinder lens 17. Such a diode signal can be used for triggering in the formation of the mean value of the radiation intensity and also for documenting the position in the travel of the path for material processing. From the totality of the output values of the diode of the diode row 18, the mean value of the intensity of the plasma beam is formed and can be used as a measure of the penetration depth.

Figure 6:
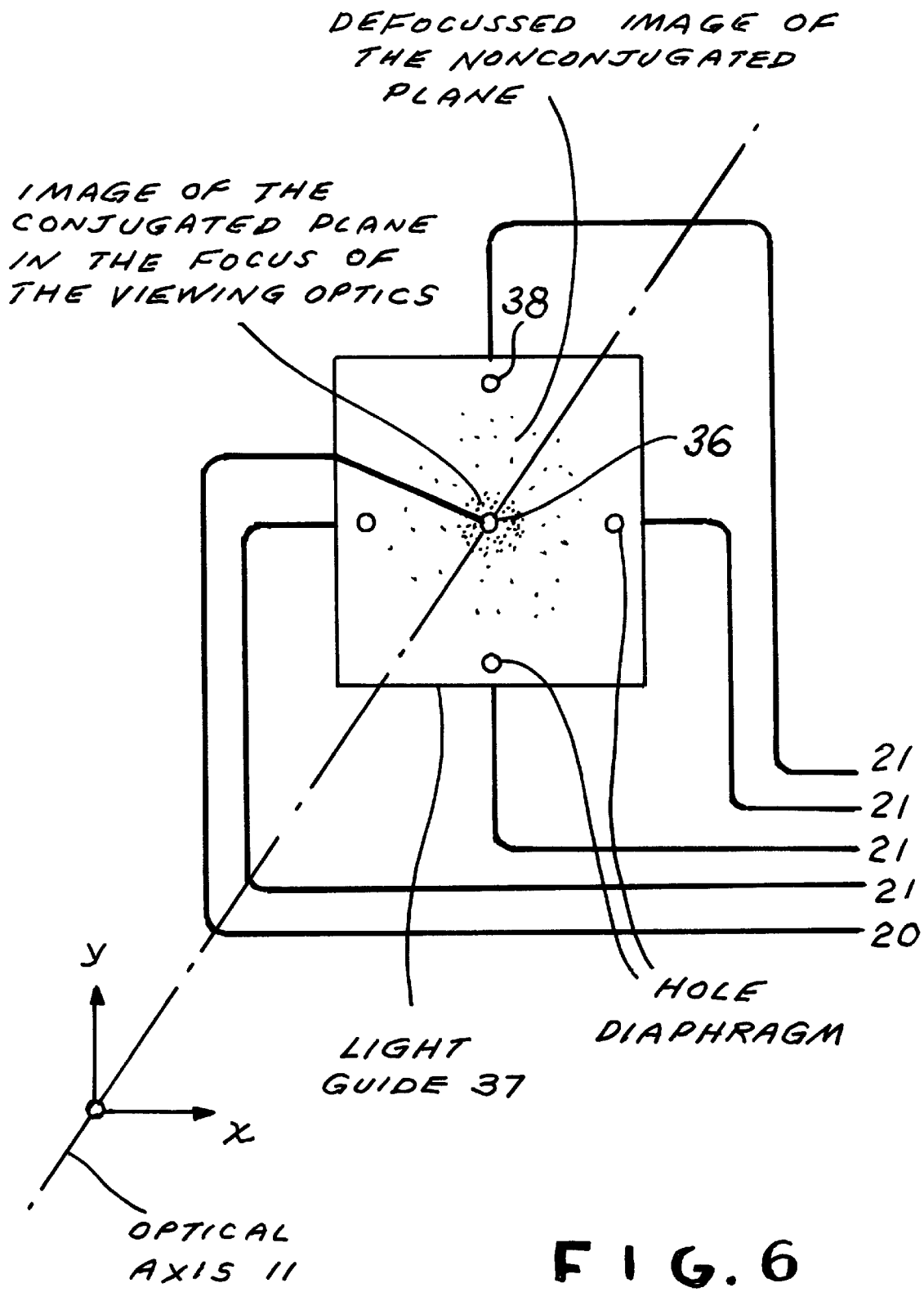
FIG. 6 is a schematic illustration of a further viewing optics according to the invention.

A further special measuring device has been illustrated in FIG. 6. In the optical axis 11 of the laser beam 12, a radiation symmetrical optics is provided as the viewing optics 16. The optics focusses the beam which arises in the plane conjugated to its image plane upon a point in the optical axis 11. At this point, a hole 36 of a perforated diaphragm 37 is located. Behind the hole a light sensor 20 is provided as a light waveguide, which detects the corresponding fraction of the plasma radiation of the viewing focus. The perforated diaphragm 27 has further holes 38 which lie radially removed from hole 36 and whose light sensors 21 are arranged behind them. These are also configured as light waveguides and measure the corresponding fraction of the plasma radiation whose dominating signal portion does not lie in the conjugated plane of the viewing focus 30. In this manner simultaneous signals in the depth of the interaction seen of the vapor capillary and above or below the workpiece 10 are captured and compared with one another. In FIG. 6, four holes 38 lie at the same radius spaced from hole 36. In principle a single hole 38 suffices. To obtain further information, the holes can be arranged at different radii.

We claim:

1. A process for working material with plasma induced by laser radiation comprising the steps of:

observing radiation arising from a vicinity of a workpiece along an axis of laser radiation focused on the workpiece as a function of time;

monitoring exclusively a cross section of a vapor capillary formed by plasma induced by said laser radiation in said workpiece with a depth of field encompassing an entire thickness of the workpiece; and determining a mean value of the intensity of plasma radiation from said vapor capillary as a measure of the penetration depth.

2. The process defined in claim 1 wherein the mean value of the radiation intensity is determined with exclusion of intensity peak values which simultaneously arise with optical signals detected laterally of the focused laser radiation.

3. The process defined in claim 1 wherein intensity peak values in the vapor capillary are determined by transit time differential measurements from measured values taken at the same time axially and laterally.

4. A device for material working by plasma induced by laser radiation which is focused by a mirror on a workpiece and with a radiation originating from the workpiece in the direction of the focused laser radiation as observed with viewing optics, wherein the radial observation region of the viewing optics is limited to a cross section of a vapor capillary produced by the plasma with a workpiece, the mean value of the intensity of the plasma radiation is detected by a measuring device, and the viewing optics has a cylindrical lens with a diode row arranged behind the cylinder lens in the radiation path, the diode row being inclined and connected to an evaluating unit which evaluates the output values of the individual diodes in relation to a predetermined reference value.

5. The device defined in claim 4 wherein the spectral range of the radiation originating from the workpiece is limited with a bandpass filter.

6. The device defined in claim 4 wherein the laser radiation has an annular mode, a perforated mirror is provided as the focusing mirror and a hold of the focusing mirror is arranged to lie within an annular maximum of the annular mode.

7. The device defined in claim 4 wherein the focus of the viewing optics is arranged on an underside of the workpiece.

8. A device for material working by plasma induced by laser radiation which is focused by a mirror on a workpiece and with a radiation originating from the workpiece in the direction of the focused laser radiation as observed with viewing optics, wherein the radial observation region of the viewing optics is limited to the cross section of a vapor capillary formed in the workpiece by the plasma, the mean value of the intensity of the plasma radiation is detected by a measuring device, the viewing optics has a radially symmetrical lens on the optical axis of which a light sensor is arranged which collects that radiation component which originates from the conjugated plane of the focus of the viewing optics, and at least a further light sensor, outside the optical axis of the viewing optics is arranged to acquire a radiation portion which arises from a nonconjugated plane of the focus of the viewing optics, all of the light sensors being connected to an evaluating unit which evaluates the measured radiation intensity in relation to a predetermined reference value.

9. The device defined in claim 8 wherein the light sensors are light waveguides.

10. The device defined in claim 8 wherein the spectral range of the radiation originating from the workpiece is limited with a bandpass filter.

11. The device defined in claim 8 wherein the laser radiation has an annular mode, a perforated mirror is provided as the focusing mirror and a hold of the focusing mirror is arranged to lie within an annular maximum of the annular mode.

12. The device defined in claim 8 wherein the focus of the viewing optics is arranged on an underside of the workpiece.

* * * * *